(12) United States Patent
Bornowski

(10) Patent No.: US 6,714,663 B1
(45) Date of Patent: Mar. 30, 2004

(54) METHOD AND SOFTWARE-IMPLEMENTED APPARATUS FOR GROUND PLANE ESTIMATION IN MULTI-DIMENSIONAL DATA

(75) Inventor: Arthur Steven Bornowski, Sunnyvale, TX (US)

(73) Assignee: Lockheed Martin Corp., Bethesda, MD (US)

( * ) Notice: Subject to any disclaimer, the term of this patent is extended or adjusted under 35 U.S.C. 154(b) by 0 days.

(21) Appl. No.: 09/436,607

(22) Filed: Nov. 9, 1999

(51) Int. Cl.⁷ .................................. G06K 9/00
(52) U.S. Cl. ..................... 382/106; 382/154
(58) Field of Search .............. 382/203, 291, 382/173, 106, 154; 356/3–22, 3.07, 5.04, 11; 250/559.31, 559.38; 701/4

(56) References Cited

U.S. PATENT DOCUMENTS

| | | | |
|---|---|---|---|
| 5,200,606 A | 4/1993 | Krasutsky et al. | 250/216 |
| 5,224,109 A | 6/1993 | Krasutsky et al. | 372/29 |
| 5,285,461 A | 2/1994 | Krasutsky et al. | 372/29 |
| 5,335,181 A * | 8/1994 | McGuffin | 701/200 |
| 5,430,806 A * | 7/1995 | Nettles | 382/295 |
| 5,446,548 A * | 8/1995 | Gerig et al. | 356/620 |
| 5,644,386 A * | 7/1997 | Jenkins et al. | 356/4.01 |
| 5,701,326 A | 12/1997 | Flowers | 372/99 |
| 5,893,085 A | 4/1999 | Phillips et al. | 706/52 |
| 6,137,104 A * | 10/2000 | Webb et al. | 250/226 |
| 6,148,250 A * | 11/2000 | Saneyoshi et al. | 701/4 |
| 6,249,746 B1 * | 6/2001 | Neff et al. | 702/16 |
| 6,348,918 B1 * | 2/2002 | Szeliski et al. | 345/419 |

\* cited by examiner

Primary Examiner—Mehrdad Dastouri
Assistant Examiner—Virginia Kibler
(74) Attorney, Agent, or Firm—Williams, Morgan & Amerson

(57) ABSTRACT

A method for determining the reference plane in multi-dimensional data is disclosed. In one embodiment, the method includes (a) providing multi-dimensional imagery data, referred to as set A, including an array of pixels having object pixels marked; (b) range gating about at least a subset of the marked object pixels, including marking pixels outside the range gate to form an unmarked pixel subset of set A, referred to as subset B; (c) performing maximal z density analysis on subset B, including marking pixels outside the maximum density to form an unmarked pixel subset of subset B, referred to as subset C; (d) performing a local normal vector estimate on subset C, including marking pixels having a normal vector exceeding specified threshold L from nominal to form an unmarked pixel subset of subset C, referred to as subset D; (e) performing a first ground plane fit on subset D, each pixel producing residual value X, cumulatively known as residual set X; (f) analyzing residual X, including performing a residual density analysis and marking pixels whose residual value X exceeds specified threshold M to form an unmarked pixel subset of subset D, referred to as subset E; (g) performing a second ground plane fit on subset E, each pixel producing residual value Y, cumulatively known as residual set Y; (h) analyzing residual set Y, including marking pixels whose residual value Y exceeds specified threshold N to form an unmarked pixel subset of subset E, referred to as subset F; and (i) estimating the reference plane for subset F.

26 Claims, 2 Drawing Sheets

METHOD AND SOFTWARE-IMPLEMENTED APPARATUS FOR GROUND PLANE ESTIMATION IN MULTI-DIMENSIONAL DATA

1. INTRODUCTION

1.1 Field of the Invention

The present invention pertains to identifying objects in multi-dimensional imagery data and, more particularly, estimating the ground plane in multi-dimensional imagery data.

2. BACKGROUND OF THE INVENTION

2.1 Acquisition of Multi-Dimensional Imagery Data

Multi-dimensional imagery data is an electronic picture, i.e., image, of a scene. Multi-dimensional data may be acquired in numerous ways. Laser Detection And Ranging ("LADAR") systems are commonly employed for this purpose. Referring to FIG. 2, laser signals are transmitted from a platform 18 onto a scene, e.g., a scanned field of view. Upon encountering object(s) 12 and surrounding environment 14, varying degrees of the transmitted laser signals, characteristic of the particular scene or portion thereof, are reflected back to and detected by a sensor on the platform 18. The platform 18 can then process the reflected signals to obtain multi-dimensional data regarding the object 12 causing the reflection. The multi-dimensional data captures the distance between the object 12 and the platform 18, i.e., range, as well as a number of features of the object 18 such as its height, length, width, average height, etc. The quality and accuracy of the features depends in large part on the conditions prevailing at the time the data is collected, including the orientation of the object relative to the platform (e.g., aspect and depression angles), obscurations, and pixel resolution.

The object 12 may be either airborne or, as shown in FIG. 2, on the ground 16. LADAR data is generally acquired by scanning the field of view to generate rows and columns of discrete units of information known as "pixels." Pixels are used to generate a two-dimensional "image" of the scanned field of view and are correlated to the third dimension, range information. Data acquisition, and particularly LADAR data acquisition is well known in the art and any suitable technique may be employed. Suitable techniques are disclosed and claimed in U.S. Pat. Nos. 5,200,606; 5,224,109; 5,285,461; and 5,701,326.

2.1 Processing Multi-Dimensional Imagery Data

Since platform 18 typically transmits many laser signals across a general area that may contain one or more objects reflecting the laser signals, it is necessary to examine the reflected data to determine if any objects 12 are present and if so, determine which reflecting objects 12 might be of interest. Automatic target recognition ("ATR") systems are used to identify objects 12 represented in multi-dimensional data to determine whether they are potential targets. ATR systems are often divided into four subsystems: object detection, object segmentation, feature extraction, and object identification.

Object identification is the final process which takes inputs such as the object features discussed above and establishes an identity for the object based on comparison(s) to features of known objects. The accuracy of the identification depends on several factors including the correctness of the object features used in the comparison and the number of known objects constituting potential identifications.

Feature extraction selects one or more features of object 18, such as its height, width, length, average length, etc., from the multi-dimensional imagery data. However, preceding identification and extraction, object 18 must first be detected and segmented from the environment 14 as portrayed in the multi-dimensional imagery data. This means that the accuracy of detection and segmentation directly influences the accuracy of extraction and identification.

Object detection is essentially the first sweep through the imagery data. It searches for the presence of one or more objects by processing the image data. The imagery data includes pixel information having either x, y or x, y, z coordinates in multi-dimensional space. Pixel coordinates x, y, represent vertical and horizontal position while the z coordinate represents the range, or depth, of a particular point or area in the scene relative to the platform 18.

The term "pixel" is derived from the phrase "picture element." A picture (i.e., an image) is a depiction or representation of a scene. Each pixel in the array of pixels which combine to create a picture depicts a certain amount of space in the scene.

Traditional object detection is generally accomplished by locating pixels with variances in coordinates, relative to other pixels, exceeding predefined thresholds. Common detection methods search for object boundaries, object features, or some combination thereof.

An illustrative method of detection entails the analysis of pixel coordinate data relative to linearly adjacent pixels. This method is disclosed in my commonly assigned U.S. Patent Application by Arthur S. Bornowski entitled "Improved Method and Software-Implemented Apparatus for Detecting Objects in Multi-Dimensional Data" filed Oct. 22, 1999, Ser. No. 09/426,559 hereby expressly incorporated by reference herein for all purposes as if fully set forth verbatim. The method rejects relatively homogeneously sloped pixels as ground or surroundings. If a nonhomogeneous slope exceeds a specified threshold, then the method analyzes the pixel's range discontinuity relative to each linearly adjacent pixel. If the range discontinuity, i.e., edge, exceeds a specified threshold the pixel is designates as part of an object. The method continues with each pixel in the multi-dimensional data. This novel method identifies a significant portion of the upper boundary of objects while it rejects relatively homogenous sloping terrain. This method does not sufficiently define the interface between an object and ground. Thus, there is a need to minimize the errors to segmentation and therefore feature extraction and object identification by better estimating the ground plane.

Object segmentation follows the object detection process. The segmentation procedure separates the entirety of the detected object from its surroundings for feature analysis. Detection may not fully delineate the object. Segmentation involves further analysis of the object and surroundings to accurately identify the entire object prior to feature extraction. Ground plane estimation assists in accurate segmentation.

Traditional ground plane estimation relies on both localized and global techniques. These methods typically employ regression techniques of a linear or quadratic fit, using the range as a function of the rows and columns, about the pixels in the approximation. Global techniques assume that the entire scene is flat, and thus all pixels within the scene would be used in the analysis. This technique works well on rather benign scenes but performs poorly on more dynamic scenes. Localized methods, which attempt to estimate a ground plane about an area of interest, perform better on more dynamic scenes.

2.3 Problems With Prior Art Ground Plane Estimation

A significant problem with prior art ground plane estimation methods is inaccurate determination of the object-to-ground interface. This problem can lead to erroneous object segmentation, erroneous feature extraction, erroneous feature comparisons, and ultimately to incorrect or missed object identifications.

The novel detection method leads to more accurate definition of the upper boundaries of an object. However, utilization of traditional ground plane estimation methods would lead to intolerable directional errors in the estimated ground plane. The improved method minimizes this problem because it locates more object pixels in the traditional ground plane.

However, several new problems are introduced by the illustrative detector, over and above the problems with traditional detectors. Because the improved detector is able to identify more object pixels than conventional detectors, the extra-identified pixels sometimes cause a directional bias in the existing ground plane estimation process.

Accurate segmentation over complex terrain is highly desirable. Complex terrain exacerbates the inaccurate ground/object interface problem. The novel detector accomplishes this in part while improved ground plane estimation is needed to complete the ability to accurately segment objects from complex terrain. The detection operator identifies pixels that form the upper object/ground interface. This allows for a better understanding of the object and, in turn, a better localization of the interface. In other words, the detection operator supplies data regarding the extent of the target in the image plane. Previous methods employed detection operators which only obtained a subset of the object, where the subset could lie anywhere on the object. Consequently, a relatively large segmentation window was required to segment the entire object. The problems associated with that method were exacerbated for objects in complex terrain where multiple "ground planes" or surfaces may exist. Those multiple surfaces in combination with one, and commonly several, unknown objects make it extremely difficult to extract an optimal ground plane estimate for each and every detected object. Instead, a localization process would allow for a minimal set of ground about each detected object to be operated on during ground estimation.

Yet another problem with prior art detection methods is processor over usage. An ATR system must, as a practical matter, quickly establish the best possible detection with available computing resources. Prior art systems attempting to address the aforementioned difficulties expend valuable resources, computing and otherwise.

In light of the chain reaction consequences of inaccurate ground plane estimation, namely inaccurate segmentation, extraction, and identification, there is a need for an improved method for estimating the ground plane in multi-dimensional imagery data.

3. SUMMARY OF THE INVENTION

The present invention in one embodiment is a method for determining the reference plane in multi-dimensional data. The method includes (a) providing multi-dimensional imagery data, referred to as set A, including an array of pixels having object pixels marked; (b) range gating about at least a subset of the marked object pixels, including marking pixels outside the range gate to form an unmarked pixel subset of set A, referred to as subset B; (c) performing a maximal z density analysis on subset B, including marking pixels outside the maximum density to form an unmarked pixel subset of subset B, referred to as subset C; (d) performing a local normal vector estimate on subset C, including marking pixels having a normal vector exceeding specified threshold L from nominal to form an unmarked pixel subset of subset C, referred to as subset D; (e) performing a first ground plane fit on subset D, each pixel producing residual value X, cumulatively known as residual set X; (f) analyzing residual set X, including performing a residual density analysis and marking pixels whose residual value X exceeds specified threshold M to form an unmarked pixel subset of subset D, referred to a subset E; (g) performing a second ground plane fit on subset E, each pixel producing residual value Y, cumulatively known as residual set Y; (h) analyzing residual set Y, including marking pixels whose residual value Y exceeds specified threshold N to form an unmarked pixel subset of subset E, referred to as subset F; and (i) estimating the reference plane for subset F.

4. BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings.

5. DESCRIPTION OF ILLUSTRATIVE EMBODIMENTS

Numerous specific details are set forth below in the detailed description of particular embodiments in order to provide a thorough understanding of the present invention. However, one of ordinary skill in the art having the benefit of this disclosure will understand that the present invention may be practiced without many of the details presented since such details will be necessary or useful depending on the particular embodiment being employed. For instance, the invention is placed in the context of a complete ATR system including data acquisition and object detection to facilitate an understanding of the invention. Conversely, in other instances, well known details have not been described in detail for the sake of clarity so as not to obscure the invention. It will be appreciated that supplying such details would be a routine undertaking for those of ordinary skill in the art, even if a complex and time-consuming task, given the benefit of this disclosure.

5.1 Illustrative Method For Detecting Objects

Figure 1:
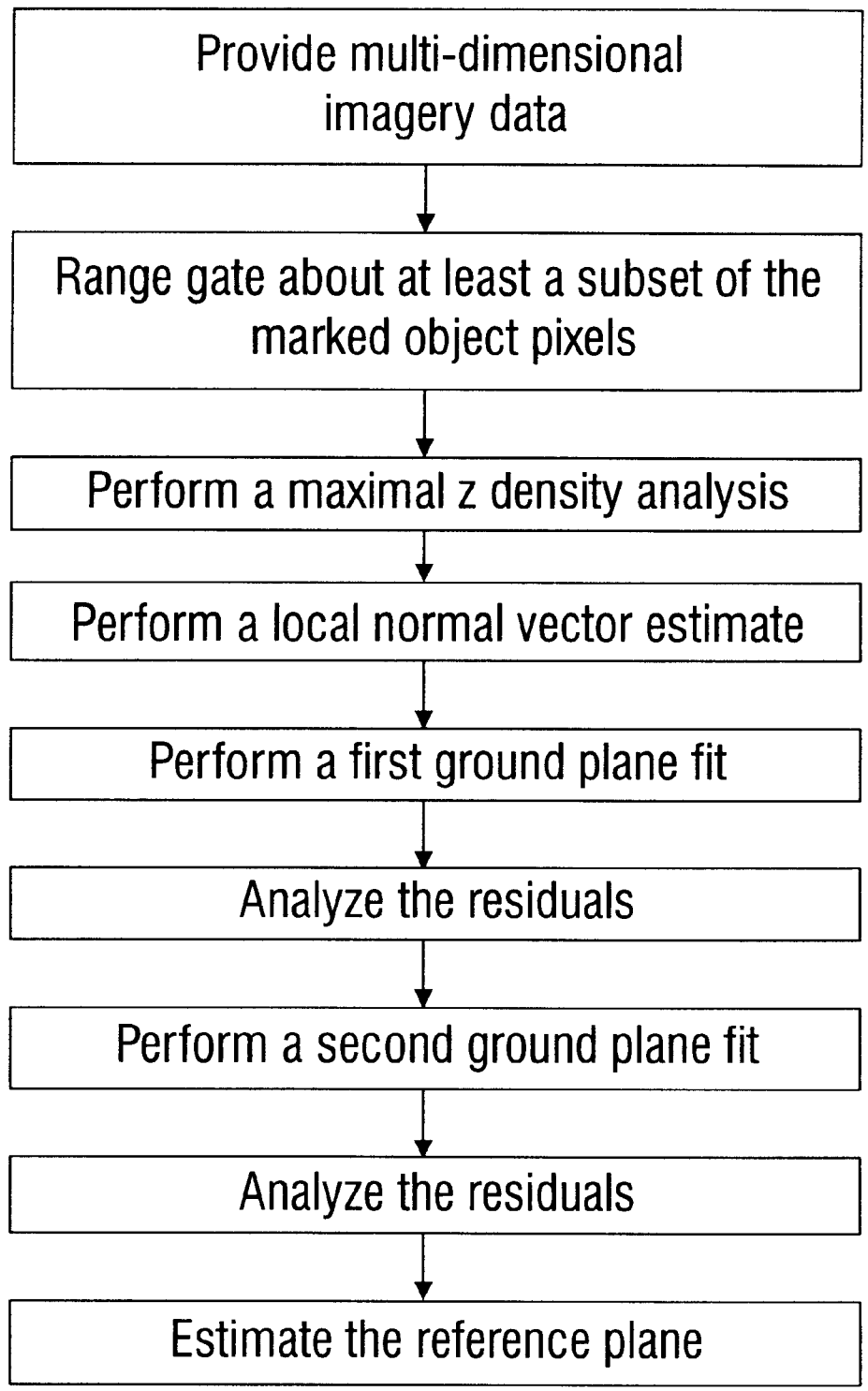
FIG. 1 illustrates a flow diagram for one embodiment of the invention.
Figure 2:
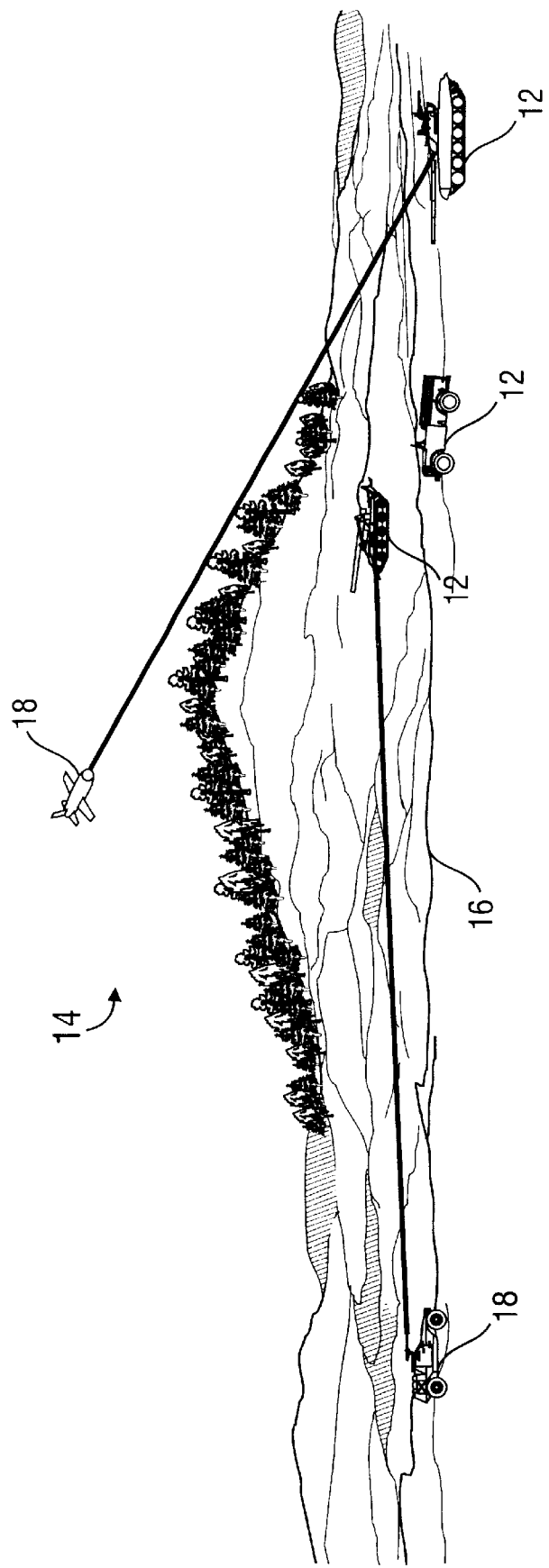
FIG. 2 illustrates the collection of multi-dimensional imagery data.

Referring to FIG. 1, an illustrative method of determining the reference plane in multi-dimensional data begins by providing multi-dimensional imagery data. Multi-dimensional imagery data is generally in the format of lookup table data (e.g., coordinates) rather than in video display format. The improved method obtains true three dimensional ground plane information by using the three dimensional Cartesian coordinate data derived from the range data. Every pixel in the scan has a range value as well as yaw and pitch angles associated with it. This information can then be used to generate a three dimensional orthogonal coordinate frame where the x axis is forward, the y axis is to the right and the z axis is down.

Nonetheless, in describing the invention the data will be referred to as an array of pixels, each representing some portion of the scene. Pixels will serve as a visual aide to the reader, regardless of the form taken by the multi-dimensional data. The array of pixels includes marked object pixels. "Marked" pixels essentially means that the status of the pixels is understood. Object pixels become "marked" during detection and the segmentation process. During ground estimation, the marked pixels are generally not considered for purposes of the estimation procedure.

Continuing with FIG. 1, the illustrative method next performs a process of "range gating" about the marked object pixels. Range gating generally consists of excluding, e.g., marking, all pixels having range values falling outside a specified distance from the range of the object. The goal is to eliminate as many unnecessary pixels as possible prior to performing the local ground plane estimate. Furthermore, since the status of all detected pixels is known, they are removed from the ground plane estimation.

Following range gating, a maximal z density analysis is carried out on unmarked pixels. Like range gating, this analysis serves to discard suspect pixels from further analysis. Suspect pixels are those appearing to be unlikely candidates for potential ground. Since terrain, even complex terrain, tends to change less abruptly than unnatural objects, filtering pixels based on their range density generally eliminates unneeded pixels, e.g., by marking them.

The z density analysis entails a determination of the location of the maximal concentration of pixels, i.e., locating the highest density of a threshold number of pixels in the z dimension. One can think of this as determining the modality of the distribution. This is accomplished by sorting the z values and then finding where the threshold number of pixels lie within a minimal z extent. Pixels having a z value falling outside these extents are marked, and are considered outliers with respect to the ground. This tends to eliminate pixels on the object whose ground plane normal may be parallel to the ground but displaced vertically, e.g., a flat top on an object.

Following the z density analysis, a local normal vector estimate is performed on all remaining unmarked pixels. The estimate includes detecting and marking pixels having a normal vector relative to estimated object vertical in excess of a specified threshold. A pixel's normal vector is 90 degrees from the sloping tendency of the pixel. Generally, pixels having a normal vector greater than 60 degrees from estimated normal (vertical) of the object can confidently be eliminated from consideration as ground pixels. Such pixels commonly represent the sides of the detected and segmented object. This can also be explained as pixels sloping greater than 60 degrees from nominal flat ground are considered to be part of the object; therefore they can be eliminated from consideration as ground, i.e., marked.

The normal vector analysis is local, i.e., carried out on subsets of unmarked pixels rather than all pixels simultaneously. In the illustrative embodiment, the subset comprises a selected pixel and its adjacent pixels. Detecting each unmarked pixel's normal relative to estimated object vertical may be performed by first determining the sloping tendency of each pixel. This is accomplished, for example, by performing a standard linear regression fit, where the pixel's z coordinate is the independent variable, and its x and y coordinates are the dependent variables. This fit is performed for each 3×3 window centered about a selected unmarked pixel.

Selected pixels are marked, i.e. excluded from further consideration as being part of the reference plane, if their ground plane normal deviates from the normal expected for a flat horizontal plane by a certain threshold. Those pixels having a normal vector deviating substantially from flat horizontal ground are assumed to be a part of the object and, consequently, are excluded from further consideration. What is flat horizontal ground and its associated normal may be influenced by the image data and/or collected or derived data regarding the conditions prevailing at the point of image data collection. Utilization of such information and its affect on relative horizontal ground is known to those skilled in the art. Though, depending upon design constraints and goals, horizontal ground may be fixed.

Referring again to FIG. 1. Following the local normal vector estimate, a linear ground plane fit is performed for all unmarked pixels, i.e., those that have survived the previous cullings. In the illustrative method, the ground plane fit is accomplished by standard linear regression, though it is not so limited. Standard linear regression produces residual values for each pixel relative to the linear regression line.

A ground plane fit is commonly accomplished utilizing standard linear regression techniques. Simple linear regression consists of defining a line (known as a regression line) that most nearly fits the distribution of image data values (i.e., pixel coordinates). The linear regression line usually is at some variance from nearly every pixel coordinate value. These variances are known as the residuals of the pixels. The so-called "best fit" for the line is that in which the sum of the squared variances produces the smallest value. Although standard linear regression accomplishes a best fit to a set of pixels, pixels falling far from the line may unnecessarily skew the line. Therefore, analysis of the residuals is appropriate to properly adjust the estimated ground plane.

It should be recognized that all of the procedures up to this point have been performed with this basic concept in mind-the minimization of the contamination that comes about when outliers (i.e., unnecessary pixels) are allowed in the regression analysis. The methods and combination of methods employed to discard unwanted pixels are many. It should therefore be obvious to one skilled in the art that the disclosed embodiment is but one method. It is therefore evident that the particular method disclosed above may be altered or modified and all such variations are considered within the scope and spirit of the invention.

Residual analysis of a linear regression line consists of analyzing the variances about the regression line to determine if any errant or otherwise distant datapoints, pixels in this case, are skewing the line and can be discarded from the linear regression analysis. It should be noted that in order to determine the best fit for correct data, erroneous data may be excluded from the data set used in the best fit analysis. Identification of erroneous data generally becomes clear only after multiple iterations of the best fit analysis.

To determine whether pixels are unnecessarily skewing the ground plane, a determination is made of the variance modality from the regression line. This may be performed in accordance with the maximal z density analysis, as discussed above, where the threshold depends on the determination of the highest concentration of pixel data. The residual values determine the lower and upper bounds where a threshold number of pixels are concentrated. The threshold may also be fixed, or variable, as opposed to strictly based on residual density. Setting the threshold is a design parameter, but in general one looks for the minimal residual extent where 75% of the pixels are located. In either case, pixels falling outside the threshold relative to the regression line become suspect and, consequently, are marked against further consideration. Following the residual analysis, the illustrative embodiment performs a second ground plane fit on the remaining unmarked pixels. Once again, a regression line is fitted to the unmarked pixels. Again the unmarked pixels produce variances from the residual line. These variances represent the height of each pixel above the estimated ground plane.

Following the second ground plane fit, the variances (i.e., residual heights) are analyzed to identify and eliminate pixels having coordinates in excess of a specified variance from the second regression line. The variance is in terms of height above the second regression line where the regression line is the estimated ground plane. The specified threshold height is a design parameter, though heights above 0.5 meters may generally be eliminated (marked) from further consideration in the ground fit process.

Referring to FIG. 1, the final step in the illustrative embodiment of the invention consists of a final ground plane fit utilizing the remaining unmarked pixel range coordinates as datapoints in a standard linear regression analysis. The final fit is used to determine the object to ground interface. The iterative fitting method serves to more accurately define the interface. This accuracy has an advantageous ripple affect on segmentation, feature extraction, and identification.

Methods embodying the invention operate better than prior art detectors on complex terrain because the standard linear regression technique assumes flat ground. If this assumption is violated, the linear regression will return the best fit normal through the multiple surface data. In most cases, this normal will be suboptimal and cause incorrect height and axis of rotation measurements. These errors impact the quality of the feature extraction process and can significantly degrade classification performance. The disclosed method attempts to remedy the faults of prior art methods by (1) localizing the segmented object and its associated ground plane normal, and (2) performing a better ground plane estimation to improve classification performance, even over complex terrain.

6. PROGRAM STORAGE DEVICE

It will be apparent to those of ordinary skill having the benefit of this disclosure that any of the foregoing variations may be implemented by programming one or more suitable general-purpose computers having appropriate hardware. The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

It can therefore be seen that the particular embodiment disclosed above is illustrative only as the invention may be modified and practiced in different but equivalent manners apparent to those skilled in the art having the benefit of the teachings herein. Furthermore, no limitations are intended to the details of construction or design herein shown other than as described in the claims below. It is therefore evident that the particular embodiments disclosed above may be altered or modified and all such variations are considered within the scope and spirit of the invention. For instance, some embodiments may apply functions rather than simple addition and subtraction to selected pixels and adjacent or local pixels even though no such particular embodiment is illustrated in the drawings. Accordingly, the protection sought herein is as set forth in the claims below.

What is claimed is:

1. A method of determining the reference plane in multi-dimensional data comprising:
   (a) providing multi-dimensional imagery data, referred to as set A, including an array of pixels having object pixels marked;
   (b) range gating about at least a subset of the marked object pixels, including marking pixels outside the range gate to form an unmarked pixel subset of set A, referred to as subset B;
   (c) performing a maximal z density analysis on subset B, including marking pixels outside the maximum density to form an unmarked pixel subset of subset B, referred to as subset C;
   (d) performing a local normal vector estimate on subset C, including marking pixels having a normal vector exceeding specified threshold L from nominal to form an unmarked pixel subset of subset C, referred to as subset D;
   (e) performing a first ground plane fit on subset D, each pixel producing residual value X, cumulatively known as residual set X;
   (f) analyzing residual set X, including performing a residual density analysis and marking pixels whose residual value X exceeds specified threshold M to form an unmarked pixel subset of subset D, referred to a subset E.;
   (g) performing a second ground plane fit on subset E, each pixel producing residual value Y, cumulatively known as residual set Y;
   (h) analyzing residual set Y, including marking pixels whose residual value Y exceeds specified threshold N to form an unmarked pixel subset of subset E, referred to as subset F; and
   (i) estimating the reference plane for subset F.

2. The method of claim 1, wherein the local normal vector estimate comprises a linear regression fit.

3. The method of claim 2, wherein the linear regression fit includes selecting a pixel within subset C and performing the linear regression on a subset of pixels within subset C comprising a three by three array of pixels centered around and including the selected pixel.

4. The method of claim 3, wherein the selected pixels are marked if beyond threshold M measured from the linear regression line.

5. The method of claim 1, wherein threshold L is 60 degrees from nominal flat ground.

6. The method of claim 1, wherein the first ground plane fit utilizes standard 37 linear regression.

7. The method of claim 1, wherein threshold M is 75%.

8. The method of claim 6, wherein threshold M is the percentage representing the smallest deviation from the regression line yielding the highest density of pixels.

9. The method of claim 1, wherein the specified threshold N is 0.5 meters.

10. A method of determining the reference plane in multi-dimensional data comprising:

(a) providing multi-dimensional imagery data, referred to as set A, including an array of pixels having object pixels marked;

(b) range gating about at least a subset of the marked object pixels, including marking pixels outside the range gate to form an unmarked pixel subset of set A, referred to as subset B;

(c) performing a local normal vector estimate on subset B, including marking pixels having a normal vector exceeding a specified vector threshold to form an unmarked pixel subset of subset B, referred to as subset C; and (d) performing a ground plane fit on subset C.

11. The method of claim 10, further comprising:

(e) revising subset B by performing a maximal z density analysis on subset B, including marking pixels outside the maximum density to form unmarked pixel subset B.

12. The method of claim 10, wherein the local normal vector estimate comprises a linear regression fit performed on a subset of pixels within subset B.

13. The method of claim 12, wherein the subset of pixels within subset B comprises a three by three array of pixels.

14. The method of claim 10, wherein the vector threshold is 60 degrees from nominal flat ground.

15. The method of claim 10, wherein the ground plane fit produces a residual value for each unmarked pixel, further comprising:

(e) analyzing the residual values, including performing a residual density analysis and marking pixels whose residual value exceeds a specified threshold to form an unmarked pixel subset of subset C, referred to a subset D.

16. The method of claim 15, wherein the specified threshold is 75%.

17. The method of claim 15, wherein the specified threshold is approximately the lowest percentage yielding the highest density of residual values.

18. The method of claim 15, further comprising:

(e) estimating the reference plane for subset D.

19. A method for determining the reference plane in LADAR data in an automatic target recognition system, comprising:

removing a plurality of outliers from an array of three-dimensional imagery data to produce a local set of imagery data, including:

range gating a marked subset of the array of three-dimensional imagery data to produce the local set of imagery data; and at least one of:

performing a maximal z density analysis to exclude from the local set of imagery data a plurality of data outside a maximum density;

performing a local normal vector estimate to exclude from the local set of imagery data a plurality of data exceeding a specified threshold from nominal; and performing a linear ground plane fit of the local set of imagery data, and iterating a residual, linear regression analysis to estimate the location of the reference plane in the local set of imagery data, each iteration including:

performing a linear best fit for a linear regression line;

excluding a plurality of data whose variance from the regression line exceeds a threshold to produce a respective residual data set; and estimating the reference plane from the residual data set resulting from the iteration.

20. The method of claim 19, wherein the variance threshold is determined by a maximal z density analysis of the local set of imagery data.

21. The method of claim 19, wherein the variance or variable.

22. The method of claim 19, wherein estimating the reference plane includes performing a ground plane fit.

23. A method for determining the reference plane in LADAR data in an automatic target recognition system, comprising:

removing a plurality of outliers from an array of three-dimensional imagery data to produce a local set of imagery data, including range gating a marked subset of the array of three-dimensional imagery data to produce the local set of imagery data; and iterating a residual, linear regression analysis to estimate the location of the reference plane in the local set of imagery data, each iteration including:

performing a linear best fit for a linear regression line;

excluding a plurality of data whose variance from the regression line exceeds a threshold to produce a respective residual data set, wherein the variance threshold is determined by a maximal z density analysis of the local set of imagery data; and estimating the reference plane from the residual data set resulting from the iteration.

24. The method of claim 23, wherein the variance threshold is fixed or variable.

25. The method of claim 23, wherein estimating the reference plane includes performing a ground plane fit.

26. A program storage device encoded with computer readable instruction for performing the operations recited in a specific one of claims 1–18 or 20–22.

* * * * *

UNITED STATES PATENT AND TRADEMARK OFFICE
CERTIFICATE OF CORRECTION

| | |
|---|---|
| PATENT NO. | : 6,714,663 B1 |
| APPLICATION NO. | : 09/436607 |
| DATED | : March 30, 2004 |
| INVENTOR(S) | : Arthur S. Bornowski |

It is certified that error appears in the above-identified patent and that said Letters Patent is hereby corrected as shown below:

<u>Title page,</u>
Item [73], Assignee, replace "Lockheed Martin Corp." with -- Lockheed Martin Corporation --.

Signed and Sealed this

Twenty-seventh Day of June, 2006

JON W. DUDAS
*Director of the United States Patent and Trademark Office*